United States Patent [19]

Nakamatsu et al.

[11] Patent Number: 4,667,022

[45] Date of Patent: May 19, 1987

[54] REACTIVE DYE HAVING BOTH MONOCHLOROTRIAZINYL AND VINYLSULFONE TYPE REACTIVE GROUPS

[75] Inventors: Toshio Nakamatsu, Ibaraki; Yoshikazu Matsuo, Sakai; Yasuo Tezuka, Ibaraki, all of Japan

[73] Assignee: Sumitomo Chemical Company, Limited, Osaka, Japan

[21] Appl. No.: 234,157

[22] Filed: Feb. 13, 1981

[30] Foreign Application Priority Data

Feb. 20, 1980 [JP] Japan ................... 55-20924

[51] Int. Cl.$^4$ .................... C09B 62/085; C09B 62/53; D06P 1/382; D06P 1/384
[52] U.S. Cl. ........................... 534/638; 534/593; 534/598; 534/617; 534/642; 534/887
[58] Field of Search ............... 260/153; 534/617, 638, 534/642

[56] References Cited

U.S. PATENT DOCUMENTS 3,223,470 12/1965 Boedeker et al. ............. 260/153 X

FOREIGN PATENT DOCUMENTS 1007752 10/1965 United Kingdom ............. 260/153
1327301 8/1973 United Kingdom ............. 260/153
2026527 2/1980 United Kingdom ............. 260/153

*Primary Examiner*—Floyd D. Higel
*Attorney, Agent, or Firm*—Stevens, Davis, Miller & Mosher

[57] ABSTRACT

A red reactive dye represented by a free acid of the formula,

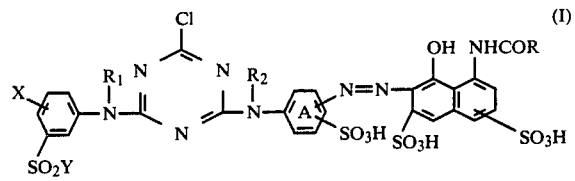

wherein X is a hydrogen atom, a methyl, methoxy or sulfonic acid group, Y is —CH=CH$_2$, —CH$_2$CH$_2$Y$_1$ or —CH$_2$CH$_2$OY$_2$ (in which Y$_1$ is a halogen atom, and Y$_2$ is the residue of polybasic acids), R is a C$_1$–C$_4$ alkyl group, R$_1$ and R$_2$ are each a hydrogen atom, a methyl or ethyl group, and the azo group is located on a meta-or para-position of the benzene ring A with respect to the —NR$_2$— group and the sulfonic acid group on the benzene ring A is adjacent to the azo group. This dye is suitable for dyeing cellulose fibers red to afford dyeings superior in fastnesses, acid stability, build-up property, level dyeing property and white dischargeability.

4 Claims, No Drawings

REACTIVE DYE HAVING BOTH MONOCHLOROTRIAZINYL AND VINYLSULFONE TYPE REACTIVE GROUPS

The present invention relates to reactive dyes capable of dyeing cellulosic fibers a red color with good dischargeability and excellent fastnesses.

It is well known that dyes having $\beta$-sulfatoethylsulfonyl group are used to dye cellulose materials as the so-called vinylsulfone type reactive dyes. However, there has never been known this kind of azo red reactive dyes of this kind capable of giving dyeings superior in dischargeability and various fastnesses, particularly chlorine fastness. This has frequently become a problem in the field of ground dyeing in accordance with dip dyeing. Consequently, there is a strong demand for the development of red reactive dyes superior in both chlorine fastness and dischargeability.

There are also well known red azo dyes having monochlorotriazinyl group as a reactive group. But, these reactive dyes usually require relatively high dyeing temperatures, and are not suitable for exhaustion dyeing but only for printing, and give dyeings unfavorable in acid stability.

Further, there are well known reactive dyes having both $\beta$-sulfatoethylsulfonyl group and monochlorotriazinyl group such as red reactive dyes of the following formulae as described in Published Examined Japanese Patent Application No. 18184/1964:

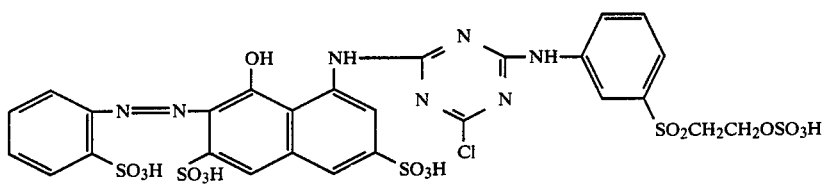

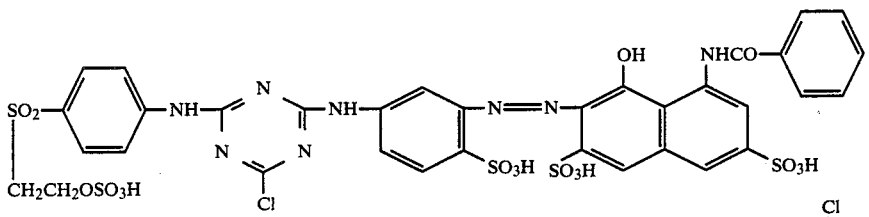

But, the former is still unsatisfactory in white dischargeability, and the latter is not suitable for exhaustion dyeing, because of unfavorable dissolving property and fixing property.

Under such circumstances, the present inventors have extensively studied to develop a red reactive dye capable of producing dyeings superior in both fastnesses and white dischargeability. As a result, it was found that a particular red monoazo dye having both $\beta$-sulfatoethylsulfonyl group and monochlorotriazinyl group as reactive groups is capable of producing dyeings having combined excellent fastnesses and white dischargeability, and can solve the drawbacks of the foregoing reactive dyes having a monochlorotriazinyl group.

The present invention provides a novel dye of the formula (I), as shown in the form of a free acid,

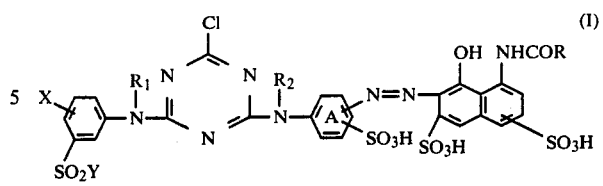

wherein X is a hydrogen atom, a methyl, methoxy or sulfonic acid group, Y is $-CH=CH_2$, $-CH_2CH_2Y_1$ or $-CH_2CH_2OY_2$ (in which $Y_1$ is a halogen atom, and $Y_2$ is the residue of polybasic acids), R is a $C_1-C_4$ alkyl group, $R_1$ and $R_2$ are each a hydrogen atom, a methyl or ethyl group, and the azo group is located on a meta- or para-position of the benzene ring A with respect to the $-NR_2-$ group and the sulfonic acid group on the benzene ring A is adjacent to the azo group.

In the present novel dyes, the preferred is the one such that $R_1$, $R_2$ and X are hydrogen, the azo group is located on a meta-position with respect to the $-NR_2-$ group and the sulfonic acid group on the benzene ring A is located on a para-position with respect to the $-NR_2-$ group.

The compound of the formula (I) can be produced by various methods as follows:

(1) A water-soluble compound of the formula (II),

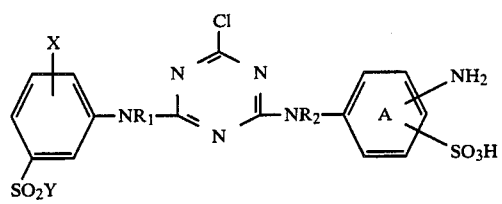

wherein X, Y, $R_1$, $R_2$ and ring A are as defined above, is diazotized and then coupled with a compound of the formula (III),

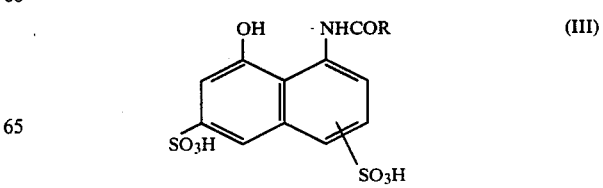

wherein R is as defined above, thereby obtaining the compound of the formula (I).

The compound of the formula (II) can be produced by condensing 2,4,6 trichloro-s-triazine in an optional order with an both amino compound of the formula (IV),

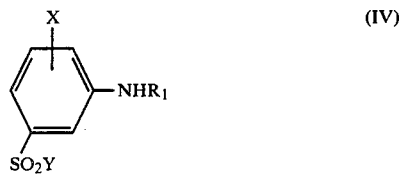

wherein X, Y and $R_1$ are as defined above, and a phenylenediamine compound of the formula (V),

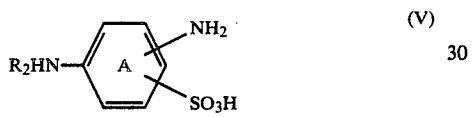

wherein $R_2$ and the ring A are as defined above. The —$NH_2$ group is located on a meta- or para-position with respect to the —$NHR_2$ group, and the sulfonic acid group is adjacent to the —$NH_2$ group. Particularly preferred is the method where the compound (II) can be produced by firstly condensing 2,4,6-trichloro-s-triazine with the phenylenediamine compound (V) at $-10°$ to 30° C. and at a pH of 1 to 9, and then with the amino compound (IV) at 0° to 40° C. and at a pH of 2 to 9.

The diazotization of the compound (II) can easily be achieved with sodium nitrite at $-10°$ to 30° C. in an acidic condition with a mineral acid. The coupling of the diazotized compound (II) with the compound (III) can be achieved at 0° to 30° C. and at a pH of 3 to 10.

(2) A compound of the formula (VI),

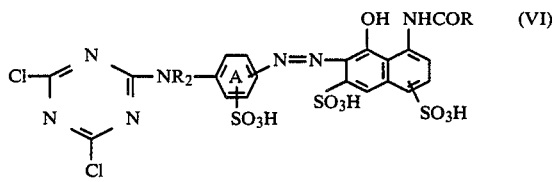

wherein R, $R_2$ and ring A are as defined above, is condensed with the amino compound (IV) to give the compound (I). The compound of the formula (VI) can be obtained by condensing 2,4,6-trichloro-s-triazine with the phenylenediamine compound (V) at $-10°$ to 30° C. and at a pH of 1 to 9, diazotizing the resulting compound with sodium nitrite at $-10°$ to 30° C. in an acidic condition with a mineral acid, and after eliminating excessive nitrous acid with sulfamic acid, coupling the diazotized compound to the compound of the formula (III) at 0° to 30° C. and at a pH of 3 to 10. For allowing this reaction to proceed advantageously, a surfactant or coupling promotor may be used. The condensation of the compound (VI) with the amino compound (IV) can easily be achieved at 0° to 40° C. and at a pH of 2 to 9.

(3) A compound of the formula (VII),

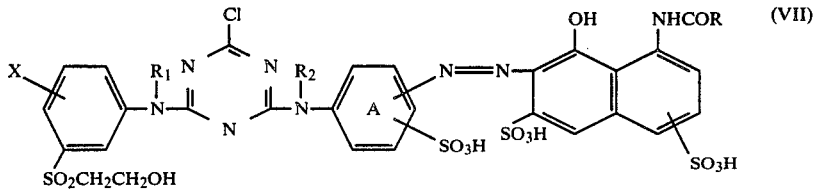

wherein X, R, $R_1$, $R_2$ and, ring A are as defined above, is esterified with excess polybasic acid, if necessary in an inert organic solvent, with water produced by the reaction being absorbed in said acid or expelled out of the system, then obtaining the compound (I). The compound of the formula (VII) can be obtained in the same manner as in the method (1) or (2) except that a β-hydroxyethylsulfone compound of the formula (VIII),

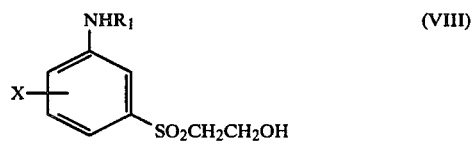

wherein $R_1$ and X are as defined above, is used in place of the amino compound of the formula (IV).

The thus obtained compound can be used for dyeing cellulose fiber materials red by a conventional dyeing method such as dip dyeing, both batchwise and continuous, and printing.

As the cellulose fiber materials to be dyed in accordance with the present invention, there may be given for example natural or regenerated cellulosic fibers such as cotton, flax, viscose rayon, viscose staple fiber, and the like.

The dip dyeing can be carried out at a relatively low temperature in the presence of an acid-binding agent (e.g. sodium carbonate, trisodium phosphate, sodium hydroxide) using a dyeing bath containing sodium sulfate or sodium chloride.

The compounds of the present invention give a dyed product superior particularly in chlorine fastness, light fastness and perspiration-light fastness, and are excellent in white dischargeability as well as build-up property, level dyeing property and acid stability.

Further, the dyes of the present invention are superior in washing-off property, making it possible to shorten the washing step after dyeing. Also, said dyes exhibit a high exhaustion percentage and fixation percentage so that dyeings of high color value can be obtained, and besides the treatment of the residual bath as waste water is very advantageous because the amount of the dyes remaining in the bath is very small.

The present invention is illustrated with reference to the following examples, which are not intended to limit the scope of the present invention. All parts in the examples are by weight.

EXAMPLE 1 m-Phenylenediaminesulfonic acid (9.4 parts) was added to water (50 parts), and the resulting solution was adjusted to a pH of 2.8±0.5 and cooled to 0° to −5° C. Cyanuric chloride (9.5 parts) was added to the solution which was then kept at 0° to −5° C. for 1 hour while adjusting the pH to 2 to 3. Thereafter, the temperature of the solution was raised to 30° to 35° C., and after adding 1-aminobenzene-3-β-sulfatoethylsulfone (16.9 parts), the solution was kept at the same temperature for 4 hours at a pH of 4 to 5.

The solution was then cooled to 0° to 5° C., and sodium nitrite (3.5 parts) and conc. hydrochloric acid (10.4 parts) were added thereto, followed by 1 hour's stirring at the same temperature. After removing excessive nitrous acid, the resulting slurry was added at 0° to 5° C. to 1-acetylamino-8-hydroxynaphthalene-3,6-disulfonic acid (16.5 parts) dissolved in water (200 parts) by means of sodium hydrogen carbonate. After adjusting the pH of the resulting solution to 5.5 to 6.5, this coupling reaction was continued to completion. Thereafter, sodium chloride (50 parts) was added to deposit crystals which were then filtered, washed and dried at 60° C. to obtain a dye (1).

EXAMPLE 2 TO 4

Procedure was carried out in the same manner as in Example 1 but using the compounds of the formulae (II) and (III) shown in the following table. The corresponding dyes were thus obtained.

| | Formula (II) | Formula (III) | $\lambda_{max}$ (nm) |
|---|---|---|---|
| (2) | [structure with SO$_2$C$_2$H$_4$OSO$_3$H, NH, triazine-Cl, NH, phenyl-NH$_2$, SO$_3$H] | [naphthalene with OH, NHCOC$_2$H$_5$, SO$_3$H, SO$_3$H] | 510 |
| (3) | [structure with SO$_3$H, SO$_2$C$_2$H$_4$OSO$_3$H, NH, triazine-Cl, NH, phenyl-NH$_2$, SO$_3$H] | [naphthalene with OH, NHCOCH$_3$, SO$_3$H, SO$_3$H] | 500 |
| (4) | [structure with CH$_3$O, CH$_3$, N, SO$_2$C$_2$H$_4$OSO$_3$H, triazine-Cl, NH, phenyl-NH$_2$, SO$_3$H] | [naphthalene with OH, NHCOC$_2$H$_5$, SO$_3$H, SO$_3$H] | 500 |

EXAMPLE 5

In the same manner as in Example 1, m-phenylenediaminesulfonic acid and cyanuric chloride were condensed, and to the resulting reaction solution were added sodium nitrite (3.5 parts) and conc. hydrochloric acid (10.4 parts) at 0° to 5° C., followed by 1 hour's stirring at the same temperature. After removing excess nitrous acid, the resulting slurry was added at 0° to 5° C. to 1-acetylamino-8-hydroxynaphthalene-4,6-disulfonic acid (16.5 parts) dissolved in water (200 parts) by means of sodium hydrogen carbonate. After adjusting the pH of the resulting solution to 5.5 to 6.5, this coupling reaction was continued to completion. The temperature of the reaction solution was raised to 30° to 35° C., and 1-aminobenzene-3-β-sulfatoethylsulfone (16.9 parts) was added to the solution which was then kept at the same temperature for 4 hours at a pH of 4 to 5. Thereafter, sodium chloride (50 parts) was added at the same temperature to deposit crystals which were then filtered, washed and dried at 60° C. to obtain a dye (5).

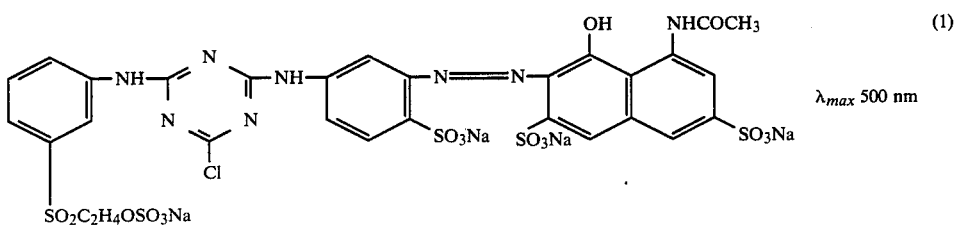

(1) $\lambda_{max}$ 500 nm

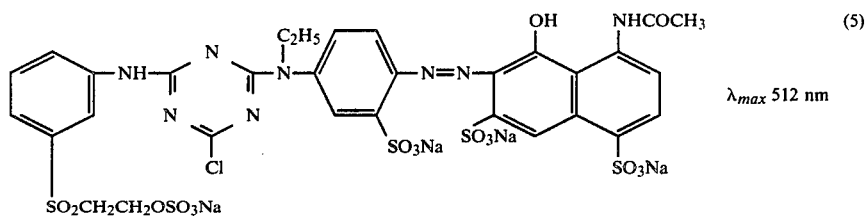

(5) λ_max 512 nm

EXAMPLES 6 TO 8

Procedure was carried out in the same manner as in Example 1 but using the compounds of the formulae (VI) and (IV) shown in the following table. The corresponding dyes were thus obtained.

while adjusting the pH to 2 to 3, and then conc. hydrochloric acid (11 parts) and sodium nitrite (4 parts) were added to the solution which was then stirred at 0° to 5° C. for 1 hour. The diazo liquor thus obtained was added to the foregoing reaction solution, and coupling reaction was carried out at 0° to 10° C. and at a pH of 6 to 8. Thereafter, the temperature of the solution was raised to 30° to 35° C., and 1-aminobenzene-3-β-sulfatoethylsulfone (14.8 parts) was added to the solution which was then kept at the same temperature for 3 hours at a pH of 5 to 6. Sodium chloride was added at the same temperature to deposit crystals which were then filtered, washed and dried at 60° C. to obtain the dye of the formula (9).

EXAMPLE 9

1-Amino-8-hydroxynaphthalene-3,6-disulfonic acid (16.0 parts) was dissolved in water (50 parts) by means of sodium hydroxide, and to the resulting solution n-butyric anhydride (15.8 parts) was added over 1 to 2 hours, followed by stirring at 20° to 30° C. Separately from this, a diazo liquor was prepared as follows: m-Phenylenediaminesulfonic acid (9.4 parts) and cyanuric chloride (9.1 parts) were added to water (60 parts), the mixed solution was stirred for 1 to 2 hours at 0° to 5° C.

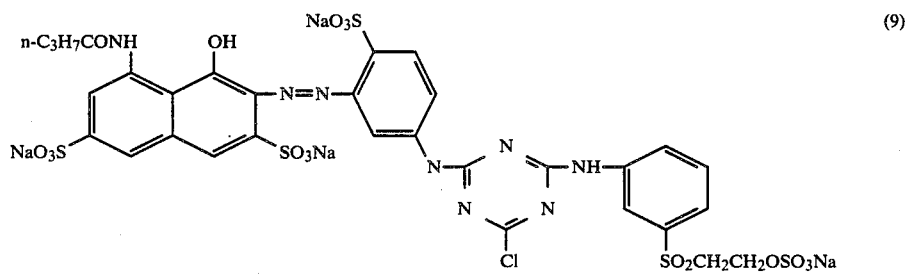

(9)

In the above example, the dye of the formula (10) was obtained using n-valeric anhydride in place of n-butyric anhydride.

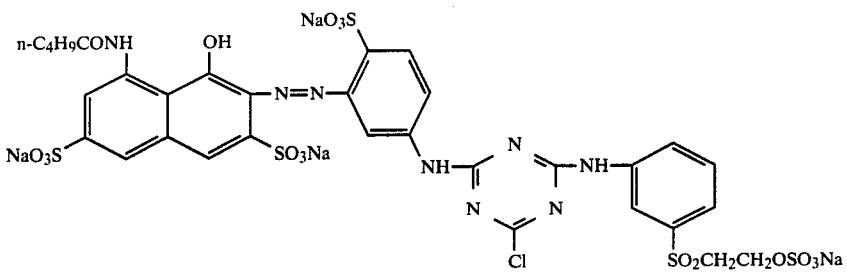

(10)

EXAMPLE 10

The dye (0.3 part) obtained in Example 1 was dissolved in water (200 parts), and sodium sulfate (20 parts) was added. Thereafter, cotton (10 parts) was put in the dye bath which was then heated to 60° C. After 30 minutes had passed, sodium carbonate (4 parts) was added, and dyeing was carried out at the same temperature for 1 hour. After completion of the dyeing, the cottom was washed with water and soaped to obtain red dyeings having good fastnesses and white dischargeability.

In the same manner as above, dyeing was carried out using the dyes (2), (3) and (4) to obtain red dyeings having good fastnesses and white dischargeability in each case.

EXAMPLE 11

The dye (0.3 part) obtained in Example 5 was dissolved in water (200 parts), and sodium sulfate (20 parts) was added. Thereafter, cotton (10 parts) was put in the dye bath which was then heated to 50° C. After 20 minutes had passed, sodium carbonate (4 parts) was added, and dyeing was carried out at the same temperature for 1 hour. After completion of the dyeing, the cotton was washed with water and soaped to obtain red dyeings having good fastnesses and excellent white dischargeability.

In the same manner as above, dyeing was carried out using the dyes (6), (7), (8), (9) and (10) to obtain red dyeings having good fastnesses and excellent white dischargeability in each case.

What is claimed is:

1. A compound represented by a free acid of the formula,

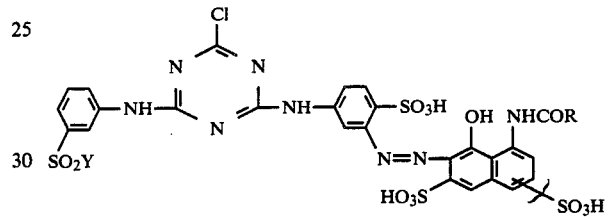

wherein R is $C_1$–$C_4$ alkyl, and Y is —CH=CH$_2$, —CH$_2$CH$_2$Y$_1$ or —CH$_2$CH$_2$O Y$_2$ in which Y$_1$ is halogen and Y$_2$ is a polybasic acid residue.

2. A compound represented by a free acid of the formula,

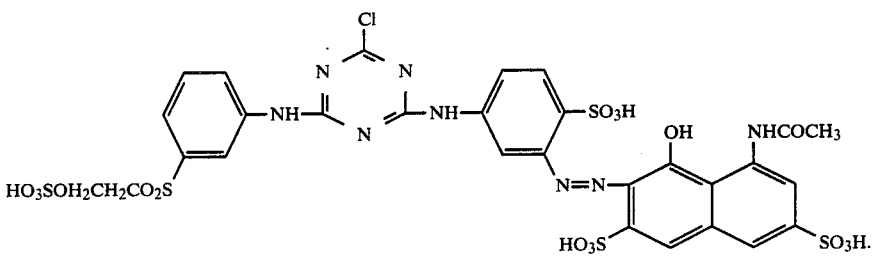

3. A compound represented by a free acid of the formula,

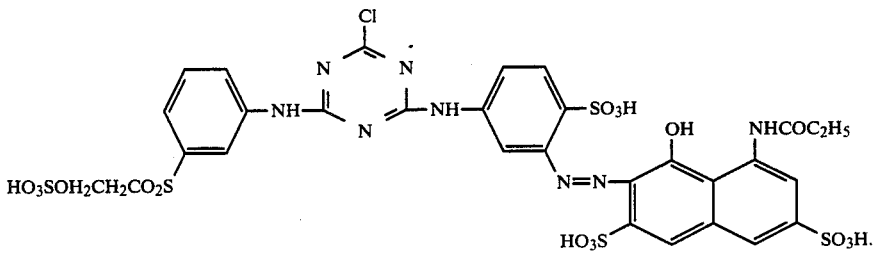

4. A compound represented by a free acid of the formula,

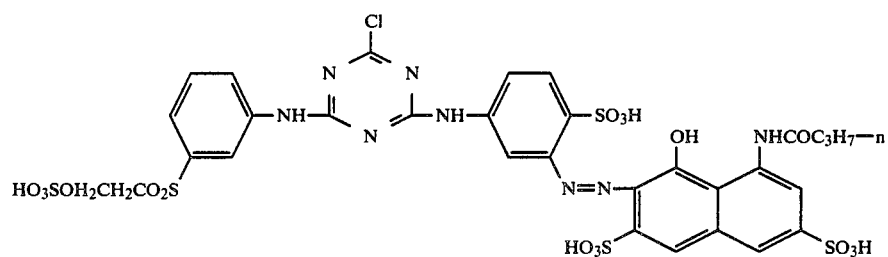
* * * * *